June 5, 1956  H. ALLEN  2,749,082
VALVE MECHANISM
Filed Dec. 31, 1954  4 Sheets-Sheet 1

Herbert Allen
INVENTOR

BY Browning, Simmons & Hyer
ATTORNEYS

June 5, 1956  H. ALLEN  2,749,082
VALVE MECHANISM
Filed Dec. 31, 1954  4 Sheets-Sheet 2
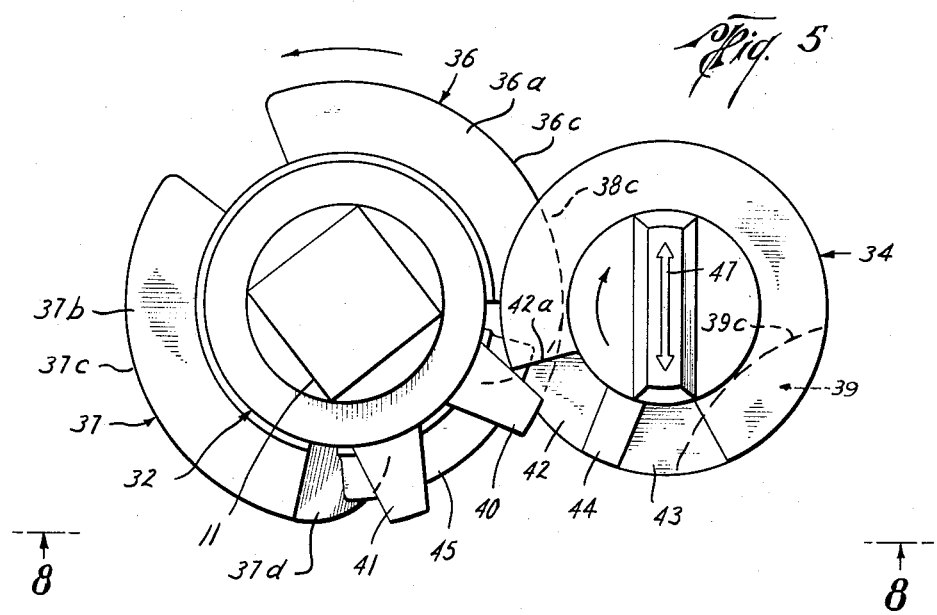
Fig. 5
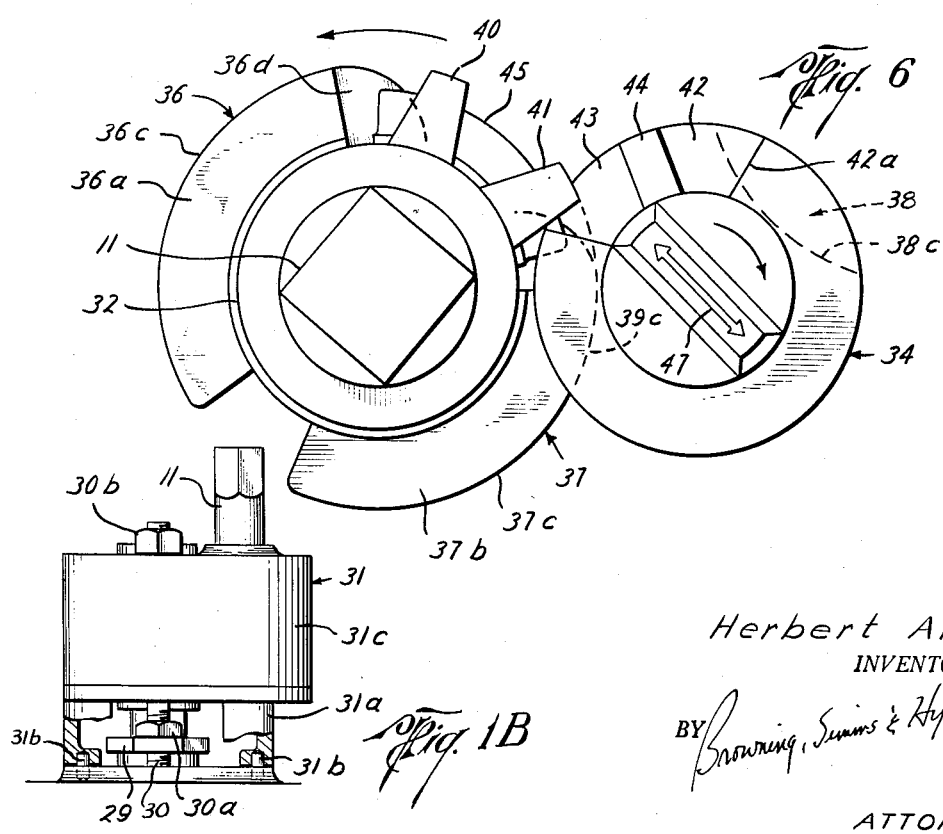
Fig. 6
Fig. 1B
Herbert Allen
INVENTOR.
BY Browning, Simms & Hyer
ATTORNEYS June 5, 1956  H. ALLEN  2,749,082
VALVE MECHANISM
Filed Dec. 31, 1954  4 Sheets-Sheet 3

Herbert Allen
INVENTOR.

BY
ATTORNEYS

June 5, 1956  H. ALLEN  2,749,082
VALVE MECHANISM

Filed Dec. 31, 1954  4 Sheets-Sheet 4

Herbert Allen
INVENTOR.

BY Browning, Simms & Hyer

ATTORNEYS

United States Patent Office 2,749,082
Patented June 5, 1956

2,749,082

VALVE MECHANISM

Herbert Allen, Houston, Tex., assignor to Cameron Iron Works, Inc., Houston, Tex., a corporation of Texas Application December 31, 1954, Serial No. 479,113

19 Claims. (Cl. 251—162)

This invention relates to improvements in actuators for valves, particularly valves of the plug type, and refers more particularly to that type of valve actuators which, upon actuation, cause a valve member to be moved to an unseated position, rotated and moved back to seated position.

The unseat, turn and reseat type of actuation, particularly for plug valves, is desirable because the valve member is difficult to turn between open and closed positions while the valve member remains in seated position. This is particularly true where the valve member and seat are tapered or frusto-conical in shape. Further, turning of the valve member while it remains seated, especially when the valve is handling a gritty fluid, frequently causes scoring of the valve member or its seat with grooves which eventually cause the valve to leak. By lifting the valve member either prior to or during its rotation, such scoring is reduced to a minimum and that which does occur is in a direction toward the ends of the plug thereby reducing the likelihood of a score causing leakage. Various mechanisms have heretofore been suggested or devised to provide this type of actuation for the valve member but many of them have not been entirely satisfactory because of their complicated nature and because they are difficult to operate both because of excessive torque requirements and because they do not operate in the normal manner of valves generally with the hand part rotated in one direction to open the valve and in another to close the valve.

For various reasons, it frequently is desirable to have the actuating shaft for the valve to extend generally parallel to the stem of the valve member and it is a general object of this invention to provide a valve actuating mechanism particularly adapted for use on a plug valve of the class described wherein the actuating shaft extends generally parallel to the rotational axis of the valve member and wherein the mechanism is simple, rugged, inexpensive and easily operated in the normal manner for opening and closing valves.

Another object of the invention is to provide a parallel shaft-stem type of valve actuating mechanism in which a simple direct connection is provided between the shaft and stem for causing rotational and endwise movement of the stem.

Another object is to provide such a type of valve actuator which does not require complicated gearing or reversing nut arrangements in order to move the stem first in one endwise direction and then in an opposite endwise direction while rotating the drive shaft in a single directional sense.

Another object is to provide a valve actuating mechanism of the parallel shaft-stem type in which the initial and final movement of the valve stem, in both the opening and closing operations, can be made to solely be endwise along its rotational axis and the stem is rotated to change the operational position of the valve member relative to the flow passage through the valve only intermediate such initial and final movements.

Another object of the invention is to provide a parallel shaft-stem type of valve actuating mechanism employing not only a direct rotary driving arrangement between the shaft and stem but also interengageable cam surfaces carried by the shaft and stem with at least one of such surfaces having oppositely inclined portions thereby providing a direct connection between the shaft and stem for moving the stem endwise first in one direction and then in an opposite direction while the shaft is rotated in a single directional sense whereby complicated reversing mechanisms between the shaft and stem are eliminated.

Another object is to provide such an actuating mechanism in which a driving connection between cam surfaces moving the stem endwise in opposite directions is interrupted so that a rotary driving mechanism can at least partially rotate the stem a predetermined amount between its endwise movements.

Another object is to provide such an actuating mechanism in which means are provided to limit endwise movement of the stem while it is being rotated and while the cam surfaces causing endwise movement are out of driving engagement.

Another object is to provide a parallel shaft-stem type of valve actuating mechanism in which separate direct driving connections are provided between the shaft and stem, one for causing rotation of the stem and another for causing endwise movement of the stem in opposite directions, all such movements being responsive to rotation of the shaft in a single directional sense.

Another object of the invention is to provide a parallel shaft-stem type of valve actuating mechanism in which the stem is directly connected with the shaft in such a manner that rotation of the shaft in a single direction causes the stem to first move endwise in one direction, rotate and then move endwise in another direction, the endwise movement being caused by oppositely inclined cam surfaces alternately engageable by follower means carried by the stem, the cam surfaces and follower means being constructed to provide a lock preventing rotation of the stem during at least a portion of the rotational cycle of the shaft.

Other objects, advantages and features of the invention will be apparent to one skilled in the art upon a consideration of the written specification, the appended claims, and the attached drawings wherein:

Fig. 1B is a view taken on the line 1B—1B of Fig. 1 and is a side elevation of the illustrated embodiment of the actuating mechanism;

Fig. 5 is a view similar to Fig. 4 but illustrates the position of the actuator parts after the driving shaft has been rotated to move the stem endwise and just before the stem begins its rotation;

Fig. 6 is a view similar to Figs. 4 and 5 except the actuator parts are in the position they occupy after the stem has been rotated and just as it is beginning its movement in an endwise direction opposite to that of Fig. 5;

Like characters of reference are used throughout the several views to designate like parts.

Figures 1, 1A, 2:
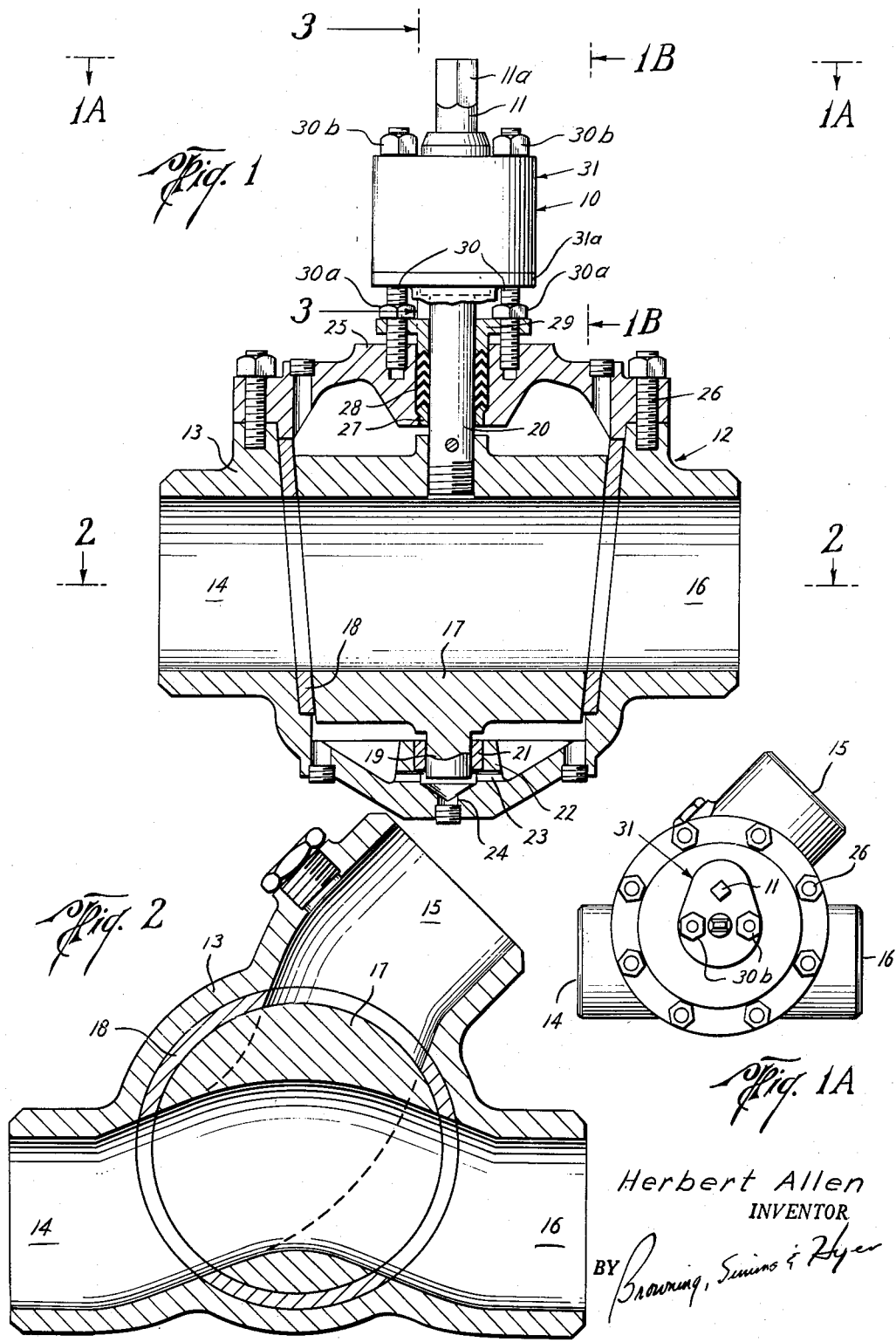
Fig. 1 is a vertical view, partially in section, of a valve embodying this invention, the valve being of the three-way type.
Fig. 1A is a plan view of the valve shown in Fig. 1 taken on the line 1A—1A of that figure.
Fig. 2 is a cross-sectional view taken on the line 2—2 of Fig. 1.

Referring to the drawings, the actuator mechanism 10 having an actuating or driving shaft 11 is illustrated as mounted upon a three-way plug valve 12. Thus, the valve can have a body 13 provided with flow ports 14, 15 and 16. Either of the two flow ports 15 and 16 can be connected for flow through flow port 14 by manipulation of a plug valve member 17. Preferably the plug valve member seats upon a removable seat ring 18 having openings aligned with the various flow ports. The seat ring and plug valve member are both tapered, i. e. frusto-conical, and while the taper has been shown to be upwardly and outwardly in the drawings, it can be reversed to be downwardly and outwardly.

The plug valve member is mounted within the body for rotational and limited endwise movement on a common axis. This may be accomplished by providing the valve member with extensions or stems 19 and 20. Stem 19 can be journaled, as by bushing 21, into a boss 22 carried at the lower portion of the plug valve cavity in the valve body. Openings 23 can be provided through the boss to prevent fluid lock of stem 19 as it moves endwise and also to facilitate draining the cavity below the plug valve member through a plugged opening 24.

Stem 20 has a sealed journal in a stuffing box arrangement carried by bonnet 25 which can be secured to the valve body by a plurality of studs 26. The stuffing box arrangement comprises a shouldered bushing 27 seated against a shoulder in the bonnet, packing 28, and gland ring 29. The packing 28 may include several V-type rings or other types of packing and compression thereof is adjustable by nuts 30a on studs 30.

It will be apparent from the foregoing that since the upper end of the plug valve member is spaced from the bonnet and is tapered upwardly and outwardly in frusto-conical fashion, it can be, by application of proper forces to stem 20, unseated by movement upwardly endwise, then rotated, and then moved downwardly endwise to reseated position. The plug valve member is, of course, maintained in proper axial alignment with seat ring 18 by stems 19 and 20 and their cooperating journals. It will also be seen that while a three-way valve has been specifically illustrated in the drawings, and while the plug valve member of the illustrated valve must be rotated 135° between its two operational positions, the plug valve can be of the conventional type having two ports and in which the plug valve member is rotated 90° between open and closed positions. By this it is meant to say that the actuator mechanism of this invention can, by a simple orientation or change in size of its parts, be made to operate a plug valve of any particular type or style as long as the plug valve member is mounted for rotational and endwise movement.

The actuating mechanism of this invention generally comprises driving and driven parts mounted respectively for rotation and for rotation and limited endwise movement upon substantially parallel axes with the parts having direct driving connections therebetween. By virtue of such connections, rotation of the driving part in a single directional sense will cause the driven part to move endwise in one direction, rotate, and then move endwise in another direction. For the illustrated embodiment of the actuating mechanism, the driving part can comprise a shaft 11 having a wrench part 11a or other connecting means and carrying a screw part 32 fixedly connected thereto as by means of a pin 33. It will be noted that the ends of the screw part extend to abut opposite sides of housing 31 and thereby prevent endwise movement of the driving part. In this connection, it might also be noted that the housing comprises a base portion 31a oriented to bonnet 25 by pins 31b and a cap portion 31c held to the base portion by nuts 30b on studs 30.

The driven part can comprise a cam part 34 mounted on the end of stem 20 and fixed thereto against relative endwise or rotative movement by means of a pin 35 extending through the cam part and stem. The cam part has sufficient clearance with housing 31 to permit it to move endwise a limited extent and also to rotate.

The direct driving connection between the driving and driven parts comprises generally a rotary driving connection, which is effective preferably during only an intermediate portion of the rotational cycle of shaft 11, and another driving connection causing endwise movement of the stem and driven part and preferably interrupted in its driving action at the intermediate portion of the rotational cycle of shaft 11.

Figure 3:
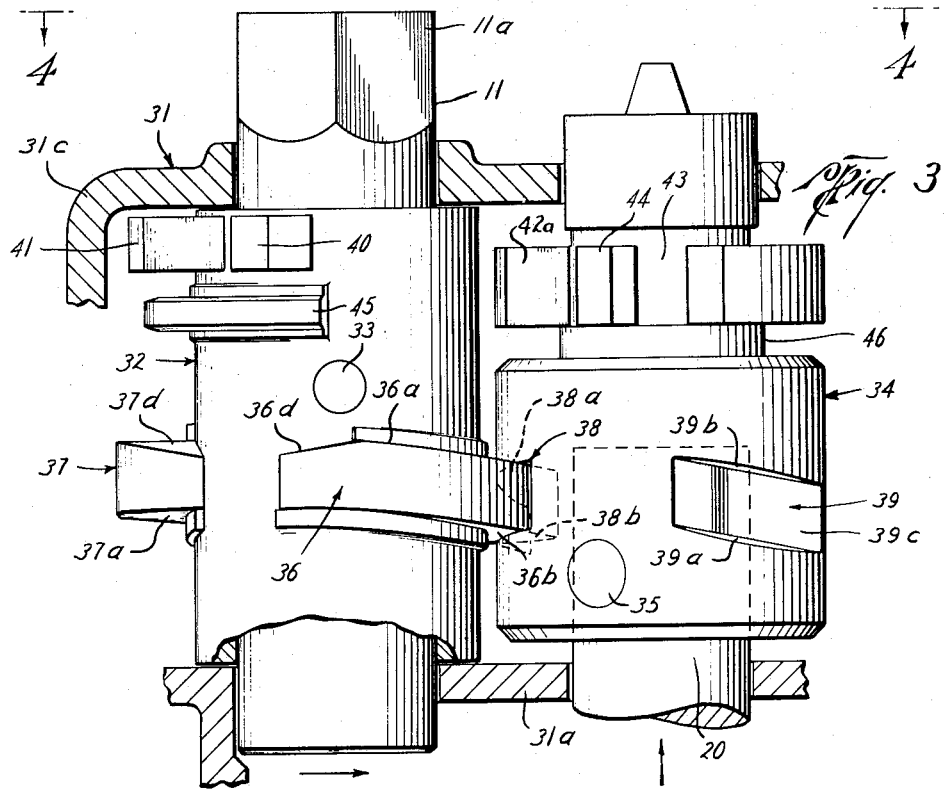
Fig. 3 illustrates a preferred embodiment of the actuating mechanism of this invention, the view being taken on the line 3—3 of Fig. 1 with the actuator housing shown only partially to better illustrate the actuator parts as they are disposed when the plug valve member is in the operational position shown in Fig. 2.
Figure 4:
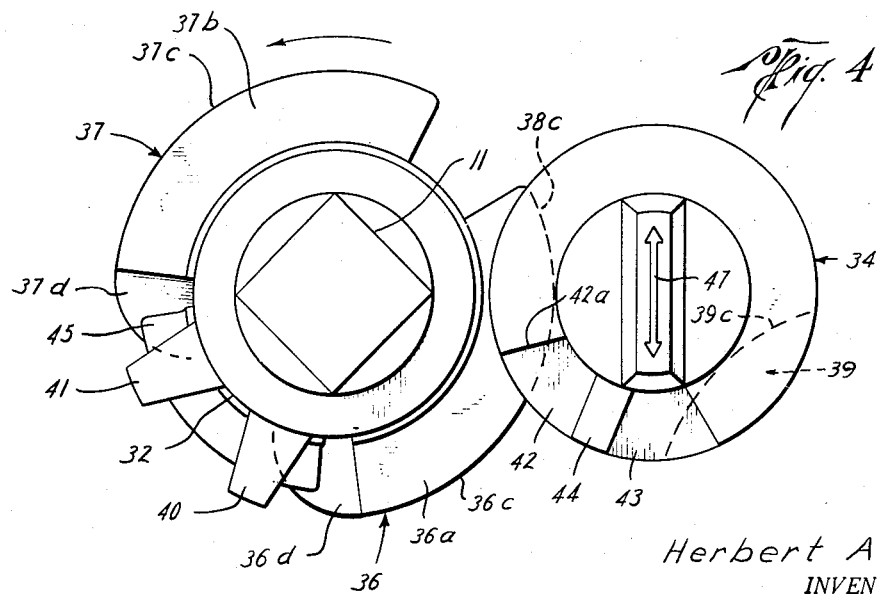
Fig. 4 is a plan view taken on the line 4—4 of Fig. 3 with the actuator housing omitted for clarity and the actuator parts being shown in the position they occupy to begin endwise movement of the stem.

Turning first to the driving connection for causing endwise movement of the stem, there are provided cam means including cam elements 36 and 37 on screw part 32 respectively engageable with follower parts in the form of recessed screw thread portions 38 and 39 on cam part 34. Cam element 36 is provided with an upper driving surface 36a adapted to be brought in driving engagement with and to slide with respect to a corresponding surface 38a defined by screw thread portion 38 on cam part 34. Since cam surface 36a is inclined relative to a plane normal to the rotational axis of cam part 34 and stem 20, rotation of shaft 11 in a counterclockwise direction as shown in Figs. 3 and 4 will cause the cam part and stem to move endwise and upwardly to unseat the plug valve member.

Similarly, cam element 37 is provided with the driving surface 37a on its lower side adapted to engage a corresponding surface 39a carried by cam part 34. Since driving surface 37a is oppositely inclined with respect to driving surface 36a and also with respect to a plane normal to the rotational axis of the cam 34 and stem 20, its movement in a counterclockwise direction past surface 39a will cause the cam part and stem to move endwise and downwardly to reseat the plug valve member.

The above described arrangement of surfaces will permit the plug valve member to be unseated and reseated with shaft 11 rotating counterclockwise. In order for the same unseating and reseating to occur when the shaft is rotated clockwise back to its original position, the cam elements are provided with driving surfaces 36b and 37b which are generally respectively parallel to surfaces 36a and 37a. Surfaces 36b and 37b are respectively engageable with corresponding surfaces 38b and 39b in thread recesses 38 and 39. Accordingly, clockwise rotation of shaft 11 first causes unseating of the plug valve member and then reseating of the same.

Figure 7:
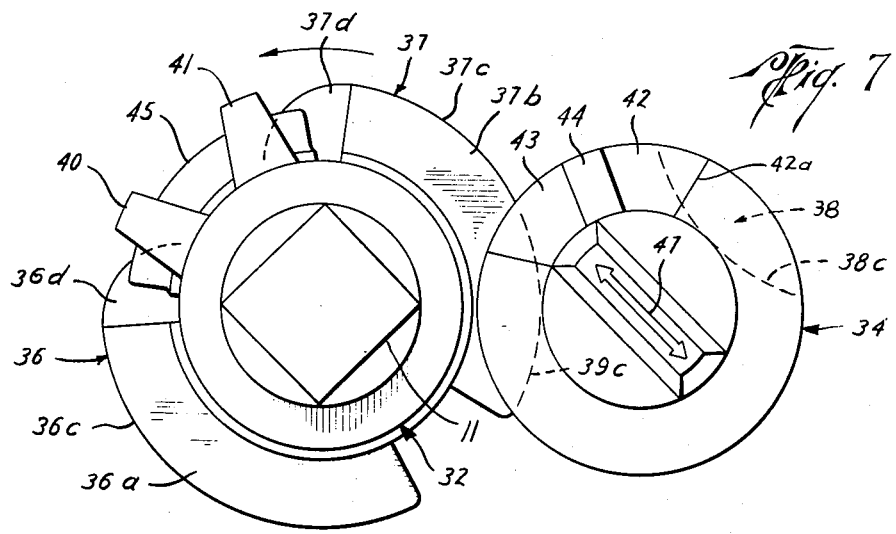
Fig. 7 illustrates the actuator parts after the stem has been moved endwise from its Fig. 6 position.

In order to hold the cam part 34 so that the inclined cam surfaces of the cam elements and the screw thread portions can be moved past one another to cause endwise movement of the cam part and stem, means are provided for limiting rotation together of screw part 32 and cam part 34 during such endwise movement. In the preferred embodiment, such means are provided by forming the peripheries 36c and 37c of cam elements 36 and 37 arcuately about the rotational axis of shaft 11. The screw thread recesses 38 and 39 have correspondingly arcuate shaped surfaces 38c and 39c likewise struck on an arc about the rotational axis shaft 11 and positioned so as to lie closely adjacent to arcuate peripheries 36c and 37c when the corresponding cam elements are disposed in their respective thread recesses. With such arrangement, it will be apparent that when cam element 36 is in engagement with thread recess 38 as shown in Fig. 4, rotation of shaft 11 will move cam part 34 and stem 20 endwise while preventing rotation thereof. On the other hand, when cam element 37 is in engagement with thread recess 39, as shown in Fig. 7, rotation of the shaft will cause cam part 34 and stem 20 to move endwise.

As indicated above, a rotary driving connection is provided between the driving and driven parts and while this can assume many forms, a preferred form is shown in the drawings as comprising a part including teeth 40 and 41 carried by screw part 32 with corresponding recesses 42 and 43 in the cam part separated by another tooth 44. With such arrangement, tooth 40, upon rotation of shaft 11, can enter recess 42 and engage end 42a of the recess to turn cam part 34. Continued rotation of shaft 11 causes tooth 41 to enter recess 43 and engage tooth 44 to continue rotation of the cam part. Still further rotation of the shaft will cause tooth 41 to disengage from the cam part. Rotation of shaft 11 in an opposite direction will, of course, cause reverse rotation to take place.

It will be noted in the drawings that cam elements 36 and 37 have their driving cam surfaces interrupted at an intermediate portion of the rotational cycle of shaft 11 and this can be accomplished by spacing the cam elements apart circumferentially on screw part 32. The driving parts for rotation comprising teeth 40 and 41 are spaced on the screw part so as to be effective during the interruption of endwise movement of cam part 34 and hence are positioned circumferentially intermediate the cam surfaces on the cam elements. This arrangement permits the cam part and stem to be moved endwise to unseat the plug valve member without rotation thereof occurring, then to be rotated without endwise movement and finally to be moved endwise without rotation to reseat the plug valve member.

Figure 8:
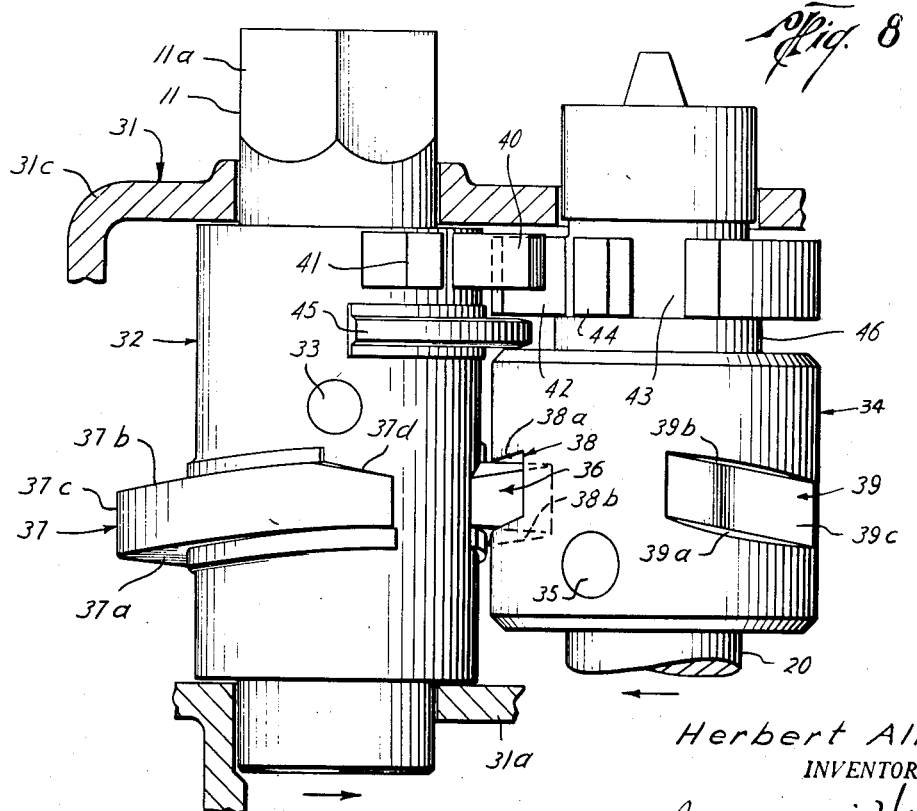
Fig. 8 is a view taken on the line 8—8 of Fig. 5 in order to better illustrate the cooperation of the parts during their actuation.

It is preferred that means be provided to limit or prevent endwise movement of the cam part and stem while the same is being rotated and since cam elements 36 and 37 are circumferentially spaced apart, such means can be provided by an arcuate ring or shoulder 45 carried by screw part 32 for engagement with a corresponding annular groove 46 on the cam part while the same is being rotated as shown in Fig. 8. It will be noted that the ring 45 extends circumferentially between the points approximating those at which inclined surfaces 36a and 37b terminate. Also, the cam elements are provided with surfaces 36d and 37d of lesser or of opposite inclination than surfaces 36a and 37b and which overlap circumferentially with ring 45 to assure ring 45 will be engaged with groove 46 before the cam elements disengage their respective thread recesses thereby assuring the plug valve element's endwise movement is controlled at all times. The inclination of surfaces 36d and 37d also assures that the cam elements can easily enter their respective thread recesses.

It is further preferred that the driving surfaces on each cam element be parallel with each other and that the driven surfaces of each of the respective thread recesses likewise be parallel with each other and spaced apart axially only enough to receive the cam elements therebetween with a fairly snug fit. Such arrangement, together with that of ring 45 and groove 46 assures that endwise movement in either direction of the cam part and stem is at all times under the control of the screw part and driving shaft.

The actuating mechanism is illustrated in several of its operative positions in Figs. 3 through 8. In Figs. 3 and 4, the mechanism is shown in its position when the plug valve member is seated and aligned as shown in Fig. 2. Upon turning shaft 11 counterclockwise, cam surface 36a drives upwardly against and moves past cam surface 38a causing the valve stem and plug to rise but not to be rotated, the latter being prevented by co-action of arcuate periphery 36c with surface 38c. Also, excessive endwise movement of the cam part and stem, as may be caused by pressure interiorly of the valve acting across the area of stem 20, is prevented by surface 38b engaging surface 36b. As the shaft continues to rotate, surface 36a of the cam element is moved to the position shown in Fig. 5 when upward driving force on surface 38a ceases and endwise movement of the plug likewise ceases. At about the same time, ring 45 moves into groove 46 to limit endwise movement of the plug during its rotation. Also, tooth 40 engages end 42a of recess 42 as shown in Fig. 5 to start such rotation of the stem and plug valve member in a clockwise direction. Continued rotation of shaft 11 towards its Fig. 6 position causes tooth 41 to enter recess 43 and eventually leave the same as well as to cause ring 45 to be disengaged from groove 46. At such time, surface 37a of the cam element has been brought into driving engagement with surface 39a. Since the cam part 34 and stem 20 are prevented from further rotation by engagement of surfaces 37c and 39c, continued rotation of shaft 11 will cause surface 37a to move along surface 39a and drive the stem in an endwise direction to reseat the plug valve member by the time the parts arrive at their Fig. 7 position. This completes the operating cycle in one rotational direction. It will be noted that valve stem 20 and the plug valve member have been rotated 135° between the Figs. 5 and 6 positions and that shaft 11 has rotated approximately 270° in its rotational cycle. Of course, the degrees of rotation of the stem by the shaft can be changed to accommodate various styles of plug valves by changing the geometry of the intermeshing teeth of the driving and driven parts. Similarly, the degrees of rotation required of the shaft to move the stem endwise a predetermined distance can be changed by changing the slope of the cam surfaces.

When it is desired to move the plug valve element back to its original position, shaft 11 is rotated clockwise and the action is just the reverse of that described above except that surfaces 36b and 37b become the active driving surfaces and surfaces 38b and 39b the driven surfaces.

If desired, the cam part can be extended through housing 31 so that an indicia 47 is made easily discernible whereby an operator can readily detect the position of the plug valve member.

One advantage of the valve actuator of this invention resides in the fact that the operating wheel or handle (not shown) on the outer end of shaft 11 is in the time-honored conventional position for an operating wheel or handle so that the operator can turn the valve member between its operating positions in just the same manner as any conventional valve. Thus, no unordinary confusion can arise as to the proper direction to turn shaft 11 and the habitual valve opening and closing habits of an operator can be adhered to.

Also, it has been found that the valve actuator of this invention may be made without the use of special anti-friction bearings in the actuating mechanism and that best results are actually obtained without their use.

It has further been found that the valve of this invention may be used to control both high and low pressures and that very little turning torque is required to operate the valve even under very high line pressure conditions. One reason for this is that there is very little friction between the parts of the actuating mechanism. Also, the parts of the actuating mechanism which frequently are subjected to the greatest forces, i. e. the cam surfaces causing endwise movement of the plug valve member, can be made to be of large enough area that excessive wear is prevented. Further, wear of the seat or plug valve member causing the latter to seat at a lower position in the valve body does not alter the force applicable to drive the plug valve member firmly into its seat since the cam elements can be made to be of sufficient circumferential length to accommodate such wear; the only change in operation of the actuator in such cases being a slightly greater rotation of shaft 11. This feature is also of value in permitting the actuator mechanism to be used on valves which vary, one from the other, in the distance the plug valve member seats into its seat.

From the foregoing it will be seen that this invention is one well adapted to attain all of the ends and objects hereinabove set forth, together with other advantages which are obvious and which are inherent to the structure and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An actuator mechanism for causing rotational and limited endwise movement of a stem and valve member comprising, in combination with said stem, a shaft rotatable on an axis substantially parallel to the rotational axis of said stem, connection means between the shaft and stem for imparting forces to the stem, upon rotation of the shaft, both in a direction along the rotational axis of the stem and in a plane normal to but at a locus displaced from the rotational axis of the stem, said means having coacting surfaces respectively carried by the stem and shaft for producing the force along said stem's rotational axis with at least one such surface having portions oppositely inclined with respect to a plane normal to said stem's rotational axis whereby rotation of the shaft in a single direction will cause the stem to move endwise first in one direction and then in an opposite direction.

2. A valve actuator mechanism for causing rotational and limited endwise movement of a stem and valve member comprising, in combination with said stem, a driving shaft separate from said stem and rotatable about an axis substantially parallel to the rotational axis of said stem, a rotary driving connection between said stem and shaft causing rotation of the stem during rotation of said shaft, a second driving connection between said stem and shaft for causing endwise movement of the stem during rotation of the shaft including a cam surface carried by one of said stem and shaft and having oppositely inclined portions engageable with a part of and movable relative to the other of said stem and shaft to cause movement of the stem, upon rotation of the shaft in a single direction, endwise in one direction upon said part moving along one of said cam surface portions and then endwise in an opposite direction upon movement of said part along the other of said cam surface portions.

3. The actuator mechanism of claim 2 wherein said cam surface is carried by the shaft for rotation with the shaft about the rotational axis of the shaft.

4. The actuator mechanism of claim 2 wherein said cam surface portions are spaced apart from each other to provide for interruption in the driving contact between said part and both of said portions whereby the stem is moved endwise during only a portion of its actuation.

5. The actuator mechanism of claim 4 wherein said rotary driving connection is discontinuous causing interrupted rotation of the stem during continued rotation of the shaft, at least a portion of said interruption occurring during endwise movement of the stem.

6. A valve actuator mechanism for causing rotational and limited endwise movement of a valve member and stem comprising, in combination with said stem, a shaft rotatable about an axis substantially parallel to the rotational axis of the stem, connection means between the shaft and stem including means carried by the stem drivingly engageable with means carried by the stem during an intermediate portion of the rotational cycle of the shaft to cause rotation of the stem during such intermediate portion, cam means carried by the shaft for rotation therewith and including portions having surfaces respectively inclined oppositely to a plane normal to the rotational axis of the stem, follower means on the stem alternately engageable with said surfaces upon rotation of the shaft to impart an endwise reciprocatory movement to the stem, said surfaces being circumferentially positioned on the shaft to afford said endwise movement adjacent the ends of the rotational cycle of the shaft.

7. The actuator mechanism of claim 6 wherein said surfaces are circumferentially spaced apart from each other as to interrupt endwise driving engagement with said follower means during at least some of said intermediate portion of the rotational cycle of said shaft.

8. The actuator mechanism of claim 7 in combination with parts carried by the shaft and stem interengageable during interruption of said driving engagement between said surfaces and said follower means to limit endwise movement of the stem during said interruption.

9. The actuator mechanism of claim 6 wherein said cam means portions have peripheries curved arcuately about the rotational axis of the shaft and wherein said stem has concave surfaces corresponding in curvature to those of said arcuate peripheries, the arcuate peripheries being engageable with the respective ones of said concave surfaces during endwise movement of the stem to hold the stem against rotation while said connection means is out of driving engagement.

10. In a valve actuator mechanism wherein connecting means are provided between separate driving and driven parts for rotating the driven part responsive to rotation of the driving part, the driving and driven parts having substantially parallel axes of rotation, the combination therewith of a direct connection between the driving and driven parts for causing limited endwise movement of the driven part in a direction along its rotational axis responsive to rotation of the driving part including cam and follower means carried by the driving and driven parts, said cam means providing surface portions curved about the rotational axis of the driving part and disposed circumferentially from each other about such axis so as to be alternately engageable with said follower means upon rotation of the driving part in a single direction, said surfaces being oppositely inclined to move the driven part first in one endwise direction and then in an opposite endwise direction.

11. The actuator mechanism of claim 10 wherein said surface portions are spaced apart from each other to interrupt driving engagement between both such surfaces and said follower means during continued rotation of said driving part.

12. The actuator mechanism of claim 11 in combination with surfaces carried by the driving and driven parts and engageable with each other to prevent endwise movement of the driven part, the last-mentioned surfaces being positioned on the driving and driven parts as to be so engaged during interruption in driving engagement between said cam means surface portions.

13. The actuator mechanism of claim 10 wherein said cam means also provide peripheral surfaces arcuately disposed about the rotational axis of the driving part and wherein said follower means is provided with concave surfaces corresponding in curvature to that of the peripheral surfaces, the peripheral surfaces of the cam means being adapted to engage the concave surfaces of the follower means to hold the latter against rotation during at least a portion of the endwise movement thereof.

14. A valve actuator mechanism for causing rotational and limited endwise movement of a valve member and stem comprising, in combination with said stem, a shaft rotatable about an axis substantially parallel to, said shaft having a pair of driving surfaces extending laterally of and circumferentially spaced apart about its axis and inclined oppositely with respect to a plane normal to the rotational axis of the stem, said stem having a pair of driven surfaces circumferentially spaced apart about and extending laterally of its axis and respectively engageable with said driving surfaces upon continuous rotation of the shaft in one direction to move the stem first endwise in one endwise direction, to interrupt endwise movement of the stem during a predetermined amount of rotation of the shaft and then to move the stem in an opposite endwise direction, parts carried by the shaft and stem for engagement to rotate the stem upon rotation of the shaft, said parts being positioned on the shaft and stem circumferentially intermediate said driving and driven surfaces so as to rotate the stem during said predetermined amount of rotation of the shaft.

15. The actuator of claim 14 in combination with parts carried by said shaft and stem extending respectively between said driving and driven surfaces and inter-engageable to prevent endwise movement of the stem during rotation thereof.

16. The actuator mechanism of claim 15 wherein said parts carried by the stem and shaft for engagement to rotate the stem upon rotation of the shaft comprise intermeshing teeth respectively positioned circumferentially between said driving and driven surfaces.

17. The actuator mechanism of claim 14 wherein said parts carried by the stem and shaft comprise intermeshing teeth respectively positioned circumferentially between said driving and driven surfaces.

18. A valve actuator mechanism for causing rotational and limited endwise movement of a valve member and a driven part comprising, in combination with said driven part, a driving part rotatable about an axis substantially parallel to the rotational axis of the driven part, said driving and driven parts respectively having two pairs of endwise facing driving and driven surfaces, the pairs of driving surfaces being displaced circumferentially from each other about the rotational axis of the driving part and the pairs of driven surfaces likewise being displaced circumferentially from each other about the rotational axis of the driven part causing one pair of driving surfaces to oppose one pair of driven surfaces with the driven part in one rotational position and then, upon rotation of the driven part by the driving part to another rotational position, causing the other pair of driving surfaces to oppose the other pair of driven surfaces, the surfaces of each pair of driven surfaces being axially spaced from each other to lie closely adjacent the respective pair of driving surfaces opposing the same so that during such opposition free endwise movement of the driven member is limited, one pair of at least one of the driving and driven surfaces being inclined oppositely to the respective other pair of said one surfaces, and a rotary driving connection between said driving and driven parts causing rotation of the driven part by the driving part at least between said one and other rotational positions so that continued rotation of the driving part in either direction causes both rotational movement of the driven part and endwise movement thereof first in one direction and then in an opposite direction.

19. The valve actuator mechanism of claim 18 wherein said driving surfaces on the driving part are disposed on cam elements extending radially from the driving part and wherein said driven part is provided with concave recesses having endwise walls defining said driven surfaces, the peripheries of the cam elements being arcuate about the rotational axis of the driving part, said recesses having inner walls between the endwise walls thereof curved correspondingly to said peripheries whereby the latter are adapted to respectively engage said inner walls to hold the driven part against rotation during at least a portion of the endwise movement thereof.

References Cited in the file of this patent

UNITED STATES PATENTS

| | | |
|---|---|---|
| 2,064,765 | Powell | Dec. 15, 1936 |
| 2,144,305 | Brisbane | Jan. 17, 1939 |
| 2,690,894 | Blevans | Oct. 4, 1954 |
| 2,705,609 | Prescott | Apr. 5, 1955 |